Patented Feb. 2, 1937

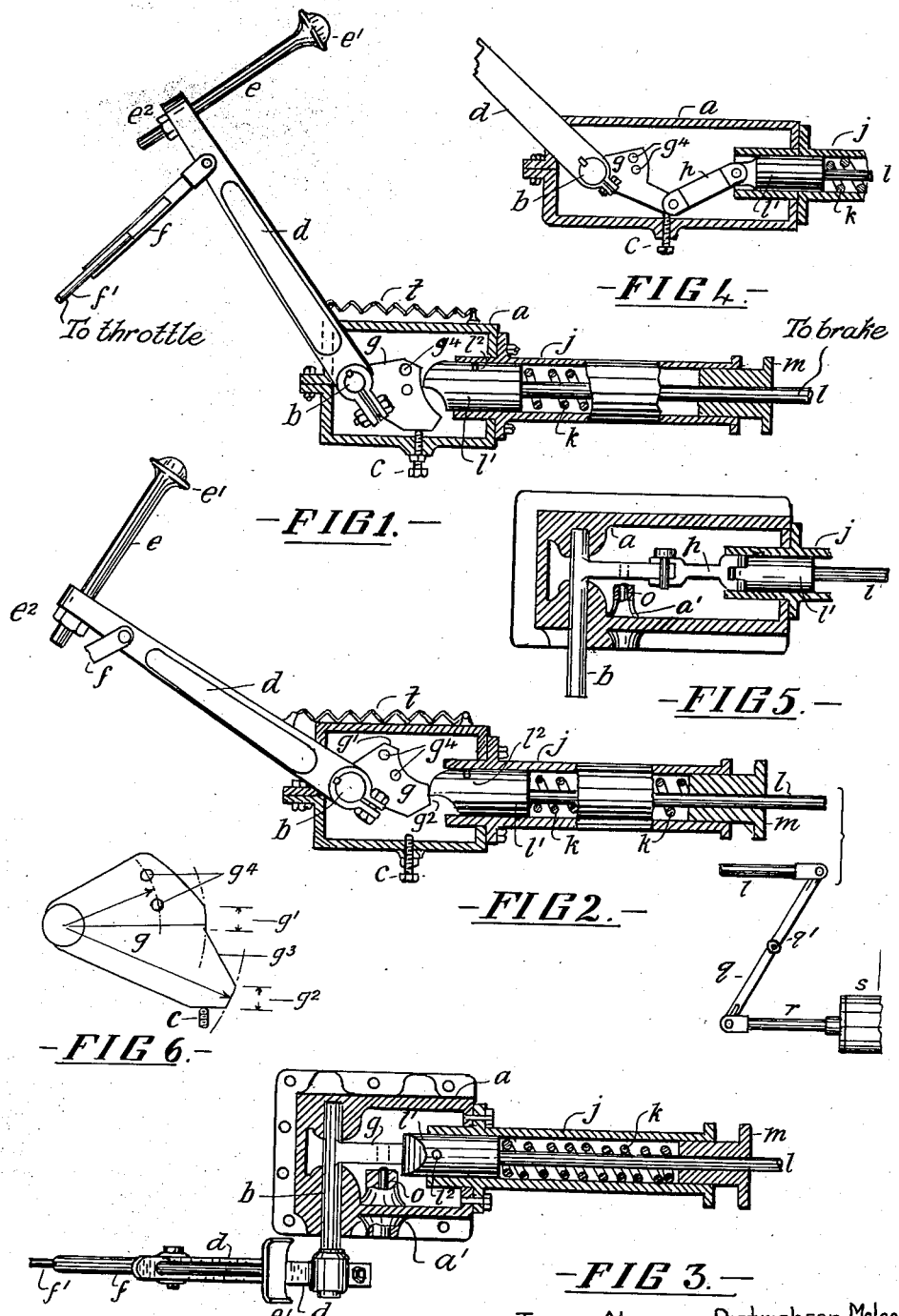

2,069,618

UNITED STATES PATENT OFFICE 2,069,618

COMBINED FOOT BRAKE AND ACCELERATOR CONTROL FOR MOTOR VEHICLES

James Algernon Dietrichsen McLean, Hampstead Gardens, Australia

Application August 19, 1935, Serial No. 36,755
In Australia May 3, 1935

4 Claims. (Cl. 192—3)

My invention relates to a combined foot brake and accelerator control for motor vehicles, the object of the same being to provide means whereby an accelerator and brake lever and connections can be operated from an adjustable pedal either for the purposes of acceleration or in the alternative to enable the brake mechanism to be applied without removing the operator's foot from the pedal.

In operative brake mechanism hitherto in general use foot pressure applied to a brake pedal has resulted in transmitting the brake effect to the wheels of the vehicle with which such brake mechanism is associated. In the following specification the means provided for operating the brake is such that the depression of the brake pedal instead of applying the brake, as has hitherto been the usual custom, not only releases the brake instead of putting it on, but in addition to such action compresses a spring which is thus made ready to apply the brake when required upon the release of the foot pedal pressure, the fuel supply remaining unaffected during the whole of the movement required for applying the brake, and conversely during the whole of the movement required for regulating the fuel supply, the brake connections are not affected.

For the purpose of my invention I provide a strong horizontal bar, hereinafter referred to as the pedal shaft, accommodated within a metal box or casing which is secured to the frame of a chassis and upon which I mount an arm or lever in the upper end of which is a screw threaded socket or hole in which the screw threaded end of a foot pedal shank is accommodated.

Between the shaft and the pedal shank I pivot a tube into which is inserted a rod which controls the throttle of the engine to which my device is applied, the device being also applicable for controlling the fuel supply when used with Diesel engines.

The brake mechanism is adapted to be operated by the pedal and lever by means of a cam, or its mechanical equivalent, formed on the pedal shaft which operates a piston having a spring return with which a brake operating rod is associated, the general arrangement being such that the foot pedal functions for opening or closing a throttle; applying the brake by releasing the pedal and accelerating the speed by foot pressure, means being provided for adjusting the spring to the tension required to operate the brake or brake mechanism as the case may be.

But in order that my invention may be more clearly understood I will now describe the same by aid of the accompanying illustrative drawing wherein:—

Fig. 1 is a sectional side elevation of my device with foot lever elevated.

Fig. 2 is a sectional elevation of the same device with the lever partly depressed.

Fig. 3 is a plan of Fig. 1.

Fig. 4 is a modification of the structure shown in the preceding figures in which a portion of the cam is extended and the pedal is in its uppermost position.

Fig. 5 is a plan of Fig. 4.

Fig. 6 illustrates by diagram certain features of cam construction.

In each of the illustrations similar letters of reference are used to denote similar or corresponding parts wherever they occur.

In the drawing $a$ is a gear box or casing which is securely fastened to a chassis and is constructed with bearings for the accommodation and support of a transverse pedal bar $b$, to which is attached a main lever $d$. In the bottom of the gear box I provide a screw threaded stud $c$ which is adapted to act as an adjusting device or stop to serve the purpose of limiting the upward movement of the pedal by restraining the downward movement of a cam which is hereinafter described.

The downward movement of the pedal is limited by the usual limit of the traverse of a throttle rod. A main lever in my device is indicated at $d$ and is securely keyed to the transverse pedal shaft $b$. At or near the upper end of the main lever $d$ I provide a screw threaded hole for the accommodation of a pedal support $e$, upon which a foot plate is indicated at $e'$. The length of this pedal support may be adjusted by means of its screw threaded portion which passes through the lever and is secured by a lock nut $e2$. Near to the upper end of the main lever I rotatably mount a throttle operating device consisting of a sleeve portion $f$ and a sliding rod $f'$.

In addition to the main lever $d$ I mount upon the shaft $b$ a cam $g$, the movement of which is controlled by the movement of the lever $d$. This cam is designed and arranged to operate the brake connections hereinafter described, and the traverse of its downward rotary movement is limited by the stud $c$. In constructing the cam I form part of its operating surface to the shape of a curve consisting of two arcs $g'$ and $g2$ of concentric circles (Fig. 6) joined by a straight or curved line $g3$, the difference of the radii of the two arcs being equivalent to the distance of the travel of an associated brake-operating piston and rod hereinafter described.

Holes g4 in the cam are so placed that when a locking pin is inserted in the lower hole the foot brake is held off for convenience whilst adjusting brake shoes or brake bands, or when moving the vehicle without the aid of its engine. When the locking pin is inserted in the upper hole the brake is held in the "full on" position as a preventative against theft. These holes are situated at even radial positions from the centre of the lever shaft as indicated in Fig. 6, and travel by radial movement to positions in alignment with a locking pin o as will be understood upon reference to Figs. 3 and 5.

Rearward of the gear box or casing I secure a tubular construction j in which I support a coil spring k and through the centre of the tubular construction I support a horizontal rod l upon the forward end of which I fasten a piston l' in which a guide pin l2 (Figs. 1, 2 and 3) is fastened and operates within a corresponding slot in the tubular construction to prevent the rotation of the piston according to usual practice.

The end of the tubular construction j is closed with a screw threaded plug m which can be rotated in either direction so as to increase or decrease the tension of the spring. The horizontal rod l is either directly or indirectly connected with brake mechanism which it operates according to requirements. The connecting parts are indicated in the extension of Fig. 2 and comprise a pivoted compensating bar q and a piston rod r which extends to a cylinder s or other equivalent device.

If my invention is applied to vehicles wherein the brake mechanism is applied by some external force and only regulated by a driver's foot the spring k in this case need be only sufficiently powerful to operate an air or vacuum valve, clutch or electric switch as the case may be.

Where brakes depend on foot pressure entirely the spring must be sufficiently powerful to pull the brake on hard enough to lock the wheels. Within the casing and preferably integral with it I provide a boss a' for a cylinder lock (Figs. 3 and 5) which upon being fitted with a key can operate a locking pin o and enable it to be directed into either of the holes g4 in the cam plate so as to retain the lever mechanism in the preferred position. I am aware that one-position locks of a somewhat similar nature have hitherto been used and for a single purpose.

In Figs. 4 and 5 I have shown a slight modification of my device wherein the piston l' instead of impinging directly upon the cam g is operated by a short connecting link p which responds to the rotary movement of the pedal shaft and causes the brake operating rod to traverse backwards or forwads in obedience to the movement of the main lever and pedal. This modification is more particularly applicable to vehicles wherein brake mechanism is actually applied by some external force and only regulated by the driver's foot.

In Figs. 1 and 2 I have indicated an external return spring t one end of which is fastened to the casing a, the opposite end being secured to the main lever d so that when pressure is removed from the lever the lever will make a rearward movement farther than that which is required to close the throttle, thereby allowing the piston l' to slide off the higher part of the cam, whereupon the spring k will push the piston forward and thereby move the rod l forward and operate the foot brake to the desired extent.

In the case of a vehicle with foot brakes where the necessary pressure would be supplied by the driver's foot, the rod l is attached at its rear end to the same part of the foot brake mechanism as the rod from an ordinary foot brake pedal would be attached to it.

In the case of a vehicle fitted with hydraulic brakes the rod l would be connected at right angles to end of a compensating bar pivoted at q' near its centre (Fig. 2 extended), to the other end of which a rod r would be pivoted at right angles projecting in the opposite direction to l, and so connected with a master cylinder s that the forward movement of the rod l would cause the rod r to force the piston of such master cylinder into its cylinder.

In the case of a vehicle fitted with foot brakes operated by compressed air, vacuum, electric or other so-called servo-mechanism the rod l would be attached to a controlling valve, switch, clutch or other controlling device of such servo-mechanism in such a manner that the forward movement of the rod would apply the foot brake.

The operation of the mechanism of my invention, briefly stated, is as follows:—

When the vehicle is stationary the pedal is in the uppermost position with the cam against the stop. When the vehicle is to be driven the pedal is depressed about three-quarters of its movement until the piston slides on to the bottom of the arc of greater radius of the cam. The piston is thus forced back against the spring and the foot brake released.

By this time the rod, connected with the throttle or fuel control, will have reached the closed end of the sleeve, and the further downward movement of the pedal opens the throttle or increases the fuel supply up to its full extent. During this further movement, the piston slides on the arc of greater radius of the cam and the brake rod thus remains unmoved.

In the modification shown in Figs. 4 and 5 the cam extension and the link p move slightly on either side of a straight line joining the centre of the pedal shaft and piston during the portion of the pedal movement devoted to accelerating the engine, and thus move the brake rod only to a very small extent, not sufficient to allow the brake to be applied.

This modification is more suitable in brake mechanism operated by external force and only regulated by the driver's foot, when the spring need be only powerful enough to actuate the controlling valve switch or other equivalent device.

From the foregoing specification it will thus be seen that the act of depressing the pedal e' instead of applying the brake as has hitherto been the usual custom, releases the brake and at the same time compresses the spring k, which is thus made ready to apply the brake when required upon the release of the foot pedal pressure, the fuel supply not being affected during the whole of the movement required for applying the brake while during the whole of the movement required for regulating the fuel supply the brake connections are not affected.

What I claim is:—

1. In a combined foot brake and accelerator control for motor vehices, a tubular structure which is firmly fastened near one end of a brake and accelerator control box, a sliding piston operable from a shaft and a lever rigidly connected to said shaft, said piston being accommodated within the tubular structure and having a rod attached thereto which is connected with brake mechanism, a compression spring contained within the tubular structure in which one end of said spring abuts the piston, the opposite end of the spring being adapted to rest against a screw threaded adjusting plug.

2. In a combined foot brake and accelerator control for motor vehicles, a lever of cam-like construction which rotates in unison with a shaft and is actuated by the brake lever, a link one end of which is attached to a brake actuating piston the other end being adapted to move through an arc of a circle whereby the piston is caused to advance or retire within its cylinder thereby operating brake mechanism.

3. In a combined foot brake and accelerator control for motor vehicles wherein a lever of cam like construction is secured to a shaft and adapted to be operated by a foot lever is used, two holes of equal size formed within the cam and of equal radial distance from the centre of the cam shaft, said holes being spaced for the accommodation of a locking pin which is adapted to maintain the lever mechanism in either of two positions in relation to the brake mechanism and a locking pin slidably supported within a portion of the casing and adapted to engage in either of the aforesaid holes.

4. In a combined foot brake and accelerator control for motor vehicles, a connecting link pivotally mounted at one end upon a lever of cam like construction attached to a transverse pedal shaft, the opposite end being attached to and adapted to operate a sliding brake rod and piston.

JAMES ALGERNON DIETRICHSEN McLEAN.